United States Patent

Hunter

[15] 3,703,921
[45] Nov. 28, 1972

[54] METHOD AND APPARATUS FOR CASTING IN MOLDS RADIALLY DISPLACED ON ROTATING TABLE

[72] Inventor: William Allan Hunter, Palantine, Ill.
[73] Assignee: Heatherwill Company, Palatine, Ill.
[22] Filed: Nov. 30, 1970
[21] Appl. No.: 93,702

[52] U.S. Cl. ............... 164/130, 164/326, 198/19, 198/75
[51] Int. Cl. ............................................. B22d 5/02
[58] Field of Search........164/18, 326, 327, 328, 129, 164/130; 198/19, 25, 75, 209

[56] References Cited

UNITED STATES PATENTS 3,029,482   4/1962   Burnett.....................164/18

*Primary Examiner*—Robert D. Baldwin
*Attorney*—Richard C. Lindberg

[57] ABSTRACT

A mould handling machine has a rotating mould receiving table adapted to hold a plurality of filled moulds which are arranged on the table in concentric rows having a center of rotation corresponding to the center of rotation of the table. The table is indexed through successive stop positions in its rotative movement at regular angular intervals to receive a mould ready for pouring. The movement of such mould on to the table radially displaces a poured mould which has gone through a full revolution on the table, and the filled mould at the inner-most row along such radius is displaced to a mould dump at the center of the table. The mould received at a stop position of the table is covered by a mould weight, and the covered mould moves with such weight to a pouring station displaced angularly from the stop position. The poured mould rotates with the table, cooling of the casting material taking place during such rotation. The poured mould is pushed radially inward after completing a revolution, when a fresh mould is received on the table, a filled mould on the innermost row which has gone through the complete cycles of rotation being then pushed to the mould dump.

20 Claims, 10 Drawing Figures

INVENTOR
WILLIAM ALLAN HUNTER

ATTORNEY

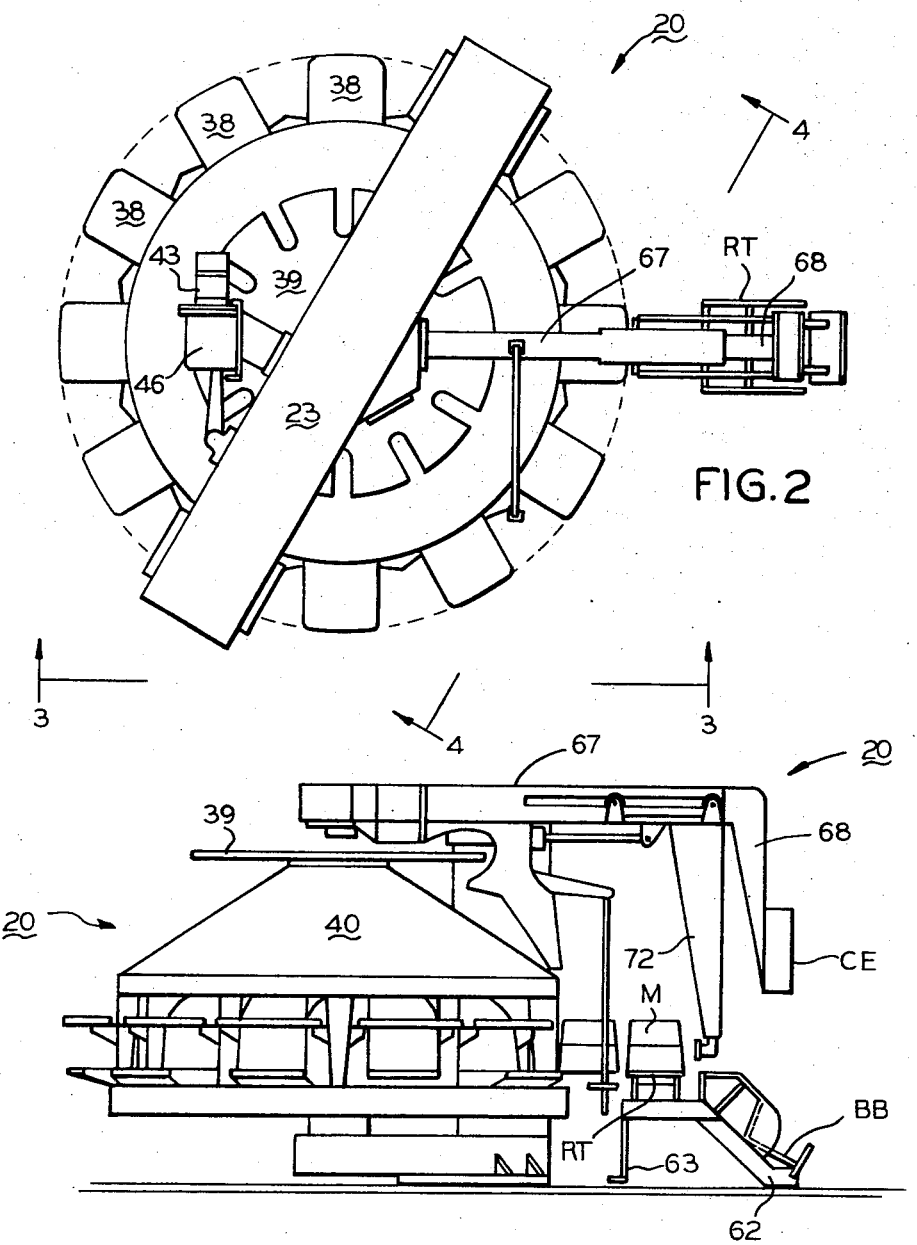

INVENTOR
WILLIAM ALLAN HUNTER
BY Richard C. Lindberg
ATTORNEY

INVENTOR
WILLIAM ALLAN HUNTER

BY Richard C. Lindberg
ATTORNEY

METHOD AND APPARATUS FOR CASTING IN MOLDS RADIALLY DISPLACED ON ROTATING TABLE

SUMMARY OF THE INVENTION

The structure according to the present invention, while not so limited, is especially adapted for use with a moulding machine such as is disclosed in Hunter U.S. Pat. No. 3,406,738, issued Oct. 22, 1968 for Automatic Matchplate Moulding Machine. Said patent discloses a machine for making slip moulds complete with the necessary gates, runners, and risers ready to be poured. Such machines can deliver moulds ready for pouring at a very rapid rate, so that the space necessary for handling a mould for pouring and the subsequent cooling of the poured mould is extraordinary. It is to the handling of such moulds that this invention is especially directed.

According to the invention structure is provided for receiving a mould and moving it in a circular path during a cooling interval. Preferably the moulds move rotatably with an annular shaped support table and are placed thereon in a pair of concentric rows, the support table rotating through step-by-step angular displacements and being adapted to receive a mould movable radially onto the table to displace a mould which has rotated with the table through an interval sufficient to cool the casting therein.

The drawings

FIG. 2 is a general plan view of the machine according to the invention;

FIG. 3 is an elevational view thereof looking in the direction of the arrows 3—3 of FIG. 2;

Figure 1:
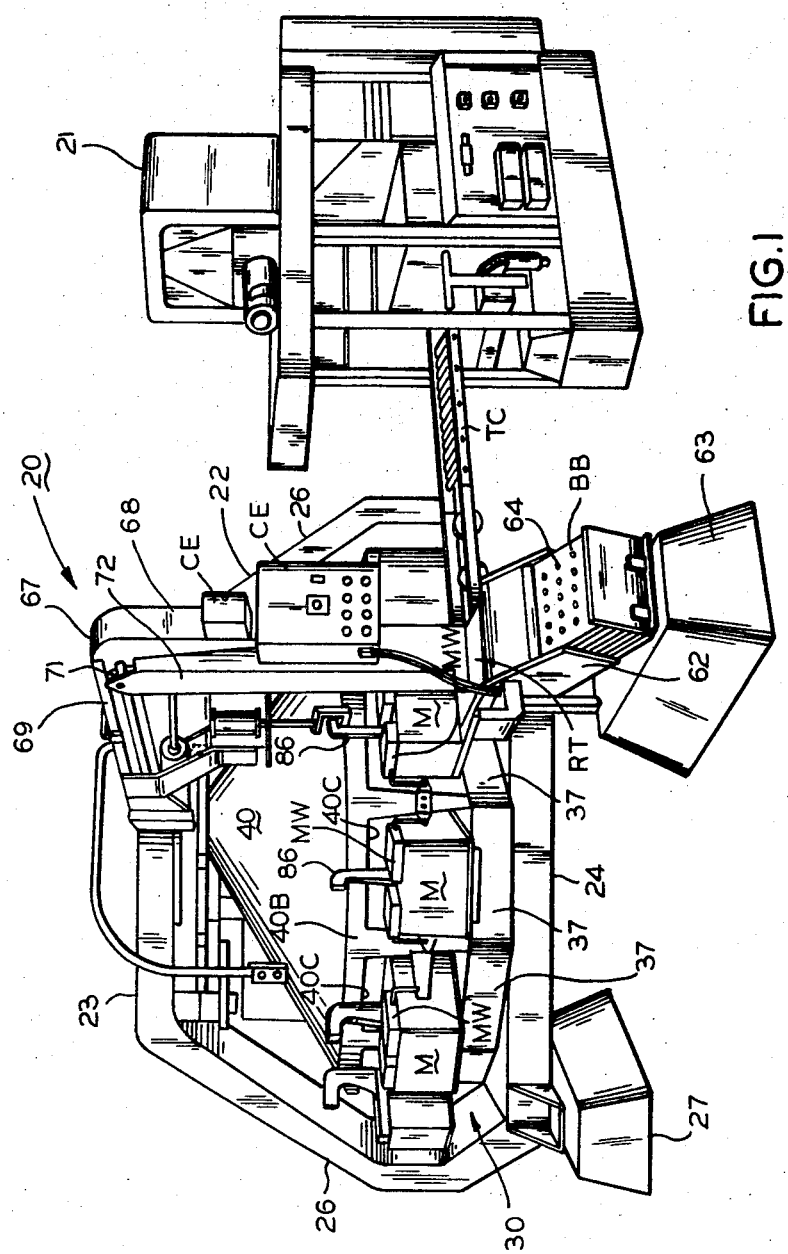
FIG. 1 is a general perspective view of a mould handling machine according to the present invention, it being shown in working relationship with an automatic mould making machine.
Figure 4:
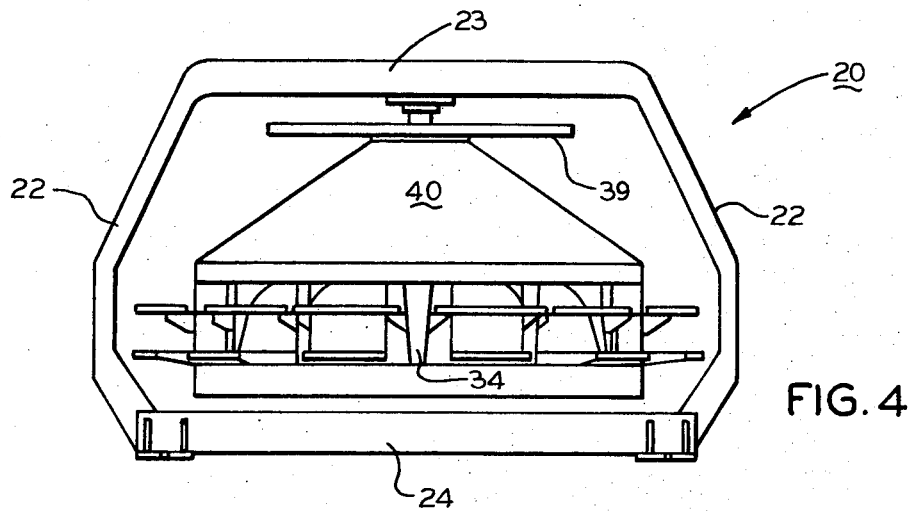
FIG. 4 is an elevational view looking in the direction of the arrows 4—4 of FIG. 2.

The mould handling machine according to the present invention is seen in FIG. 1 and is referred to generally by the reference numeral 20. It is shown in the environment of an automatic matchplate moulding machine 21 such as is disclosed in the above mentioned Hunter patent. The automatic moulding machine is adapted to deliver slip moulds therefrom, these being bed to the mould handling machine 20, at which machine the moulds will be poured and moved in a fashion to enable the castings poured in the moulds to go through a time interval sufficient to chill the same, whereby they can be delivered to conventional shakeout structure for separation of the casting from the moulding sand.

The mould handling machine 20 includes a main frame 22 consisting of an overhead frame member 23, a lower frame member 24 and essentially vertical side frame members 26 connected between the upper frame member 23 and the lower frame member 24. Frame 22 extends substantially diametrically of the mould handling machine 20, and the lower frame 24 is parallel thereto and rests upon spaced pedestals 27, only one of said pedestals being seen in FIG. 1.

Figure 5:
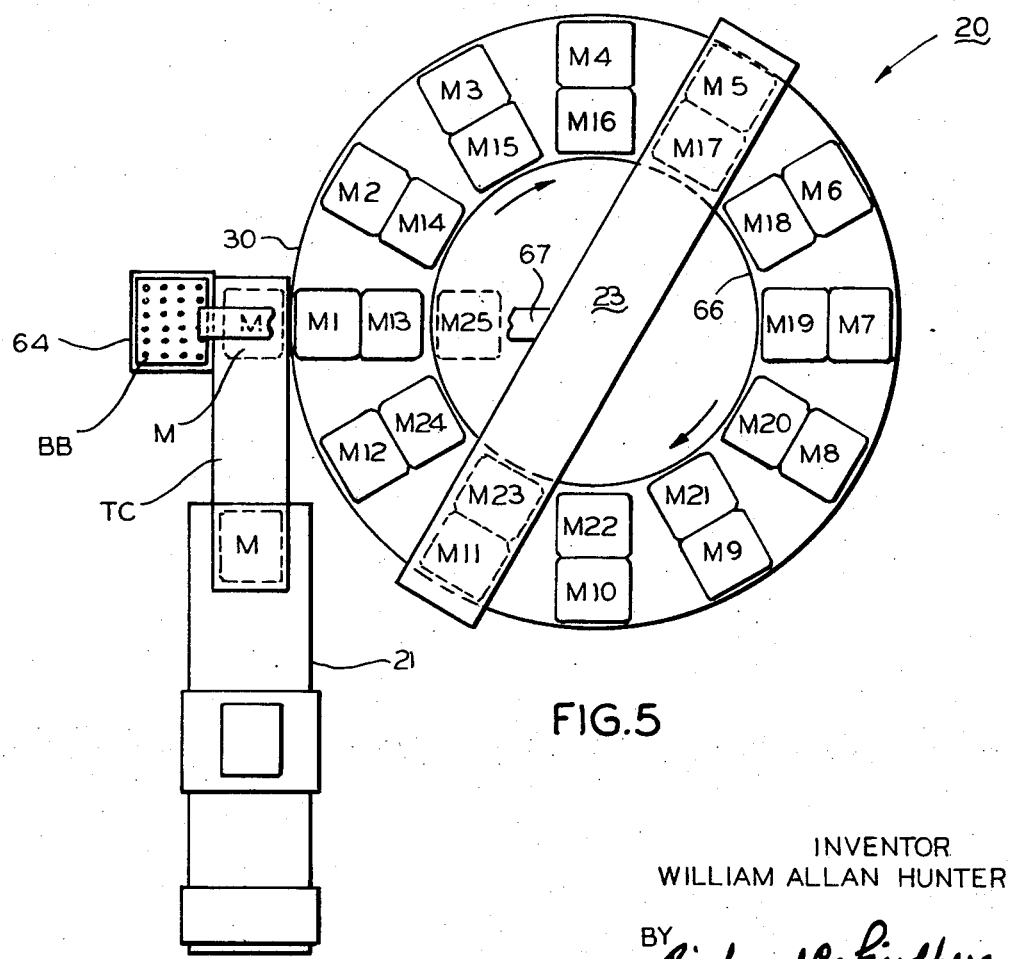
FIG. 5 is a schematic plan view of a rotating mould supporting table having moulds arranged thereon in a pair of concentric rows with a center corresponding to the center of rotation of the table, illustrating the manner in which the moulds are placed upon the table and subsequently displaced therefrom.
Figure 6:
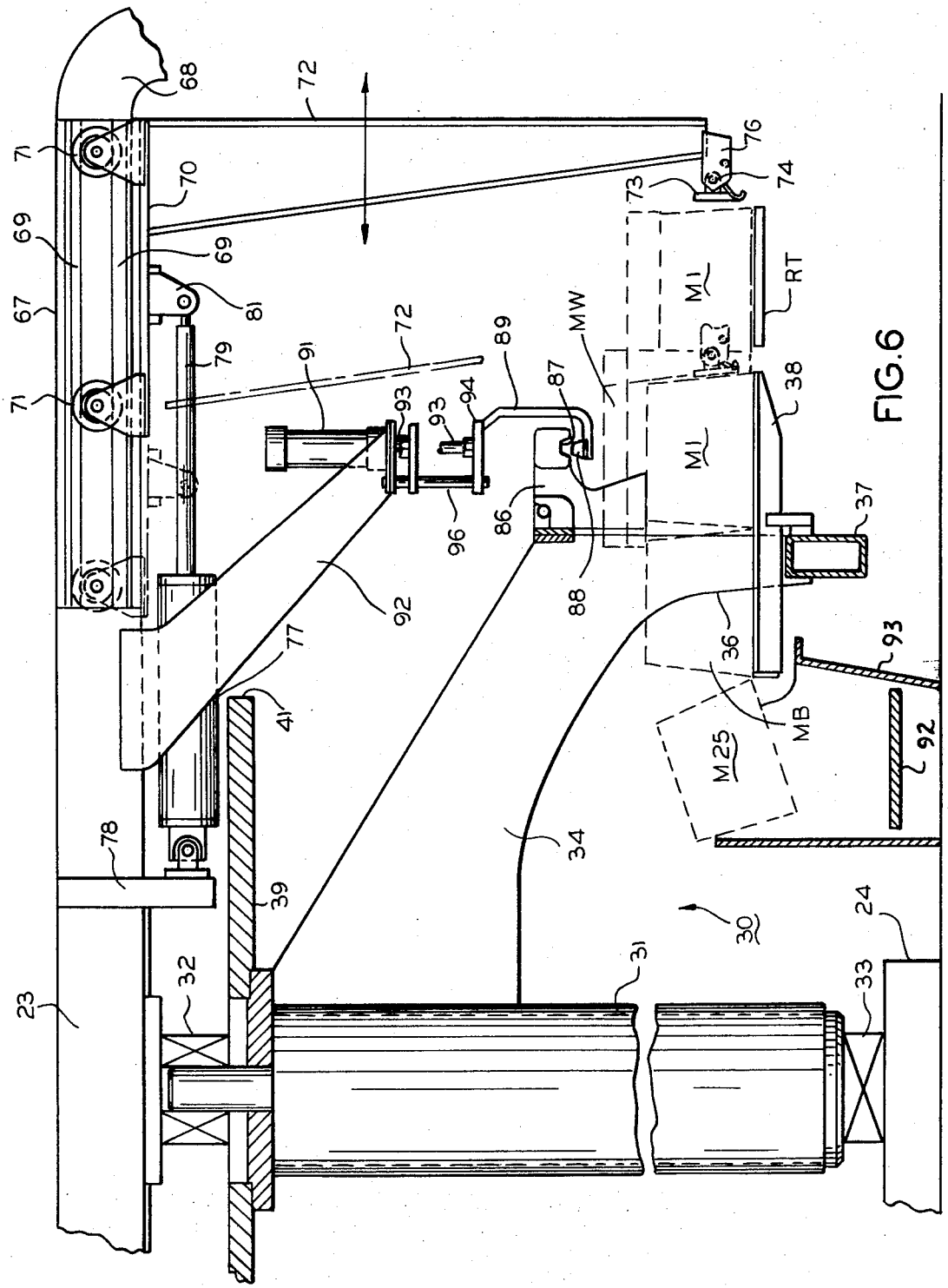
FIG. 6 is an elevational view showing details of mechanism for placing a mould on the support table.
Figure 7:
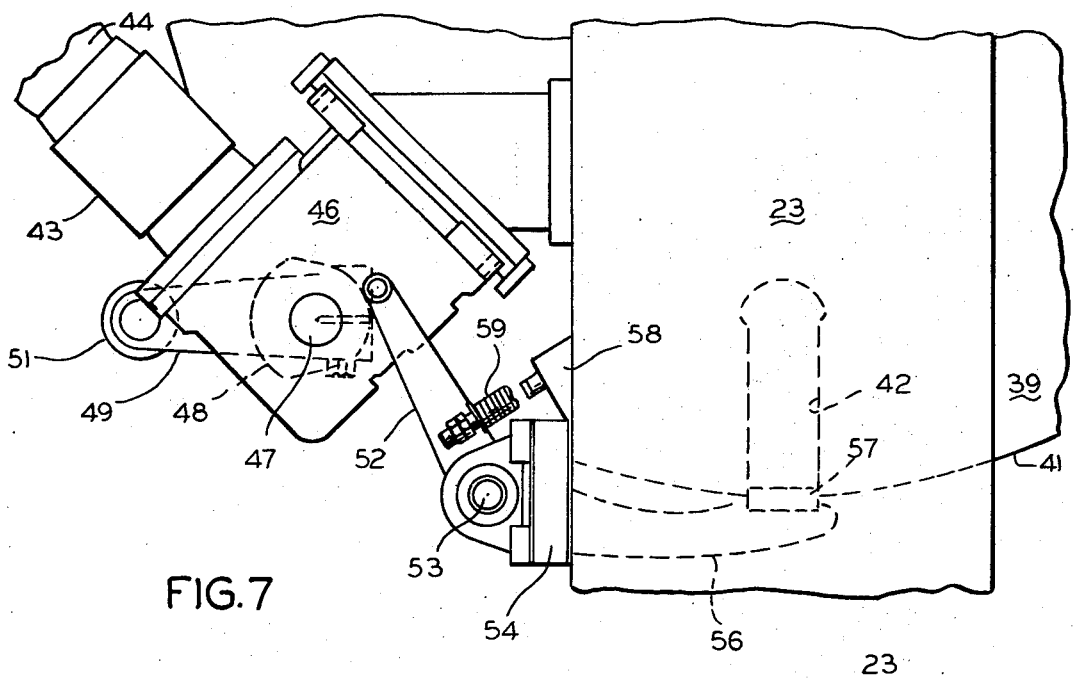
FIG. 7 is a detailed plan of mechanism for moving the support table angularly to successive indexed positions.
Figure 8:
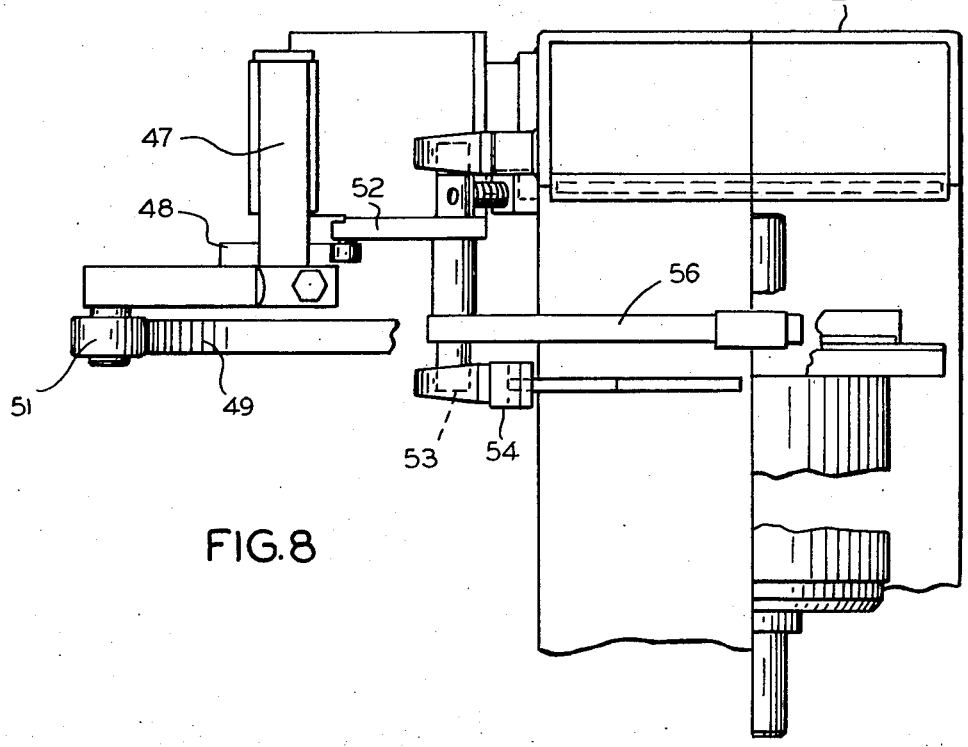
FIG. 8 is an elevational view thereof.
Figure 9:
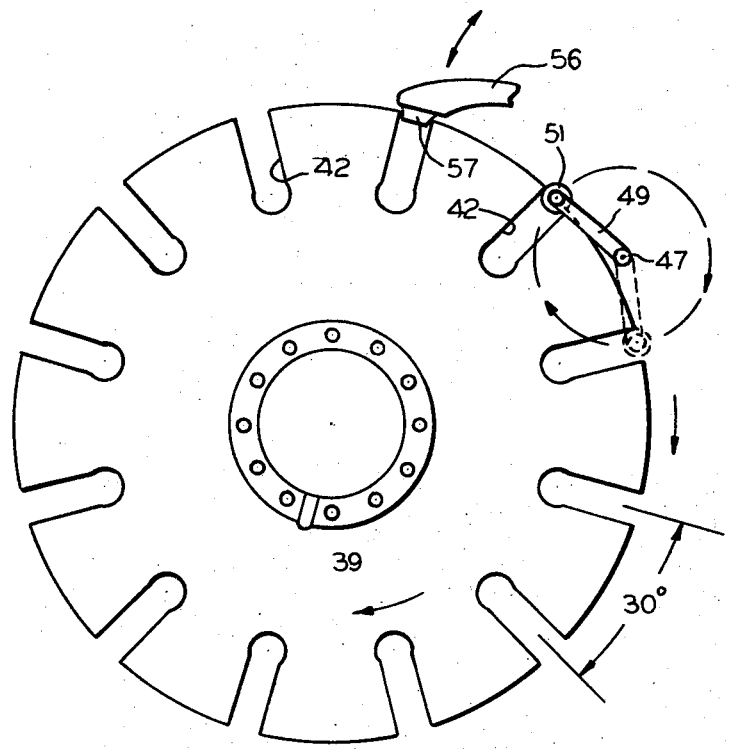
FIG. 9 is a schematic plan view of the index mechanism.

The frame 22 affords a support for a rotating mould supporting structure or table 30, see FIGS. 5 and 6, comprised of a central vertical rotating spindle 31 journaled in an upper bearing 32 secured to the underside of the upper frame member 23, and a lower bearing 33 secured to the lower frame member 24. Spindle 31 has a plurality of table supporting arms 34 equiangularly spaced with respect to spindle 31 and secured thereto in any convenient manner. The table supporting arms 34 are in this case twelve in number.

The table supporting arms 34 each have lower depending portions 36 which are joined at their lower ends to chord members 37 of rectangular cross section. Each of the chord members 37 affords a support for a table member 38 preferably welded or otherwise secured to chord member 37.

Structure is provided for rotating the mould supporting structure 30 in step-by-step fashion, and as seen in FIGS. 6 to 9 the upper end of the spindle 31 has an index plate 39 in the nature of a Geneva wheel secured thereto, index plate 39 having the periphery 41 thereof intersected by equiangularly disposed radially extending notches 42.

A drive motor 43 for structure 30 including the index plate 39 is mounted to the top frame 23 and is provided with a brake 44. Motor 43 is connected to a speed reducer 46 having an output shaft 47 therefrom, the latter having a cam 48 fast thereon. Shaft 47 has a rotating Geneva-type drive arm 49 fast thereto, the latter having the free end thereof provided with a follower roller adapted to enter the slot 42 in the index plate 39.

Cam 48 cooperates with a cam follower arm 52 journaled at 53 in a pillow block 54 secured to frame 23. Cam follower arm 52 is integral with a latch arm 56 having a latch member 57 at the end thereof adapted to enter slot 42 of index plate 39.

The motion of the Geneva drive arm 49 is such as to advance index plate 39 and structure 30 through one-twelfth of a revolution, and at the conclusion of such movement the latch arm 56 engages with slot 42 to stop rotation of structure 30. Follower arm 52 cooperates with a control switch 58 operated by an actuator 59 mounted on the arm 52 to deenergize the motor 43. Suitable control equipment CE, seen in FIG. 1, is provided to reset switch 58, so that it is in position to recycle motor 43 and the drive mechanism just described.

Figure 10:
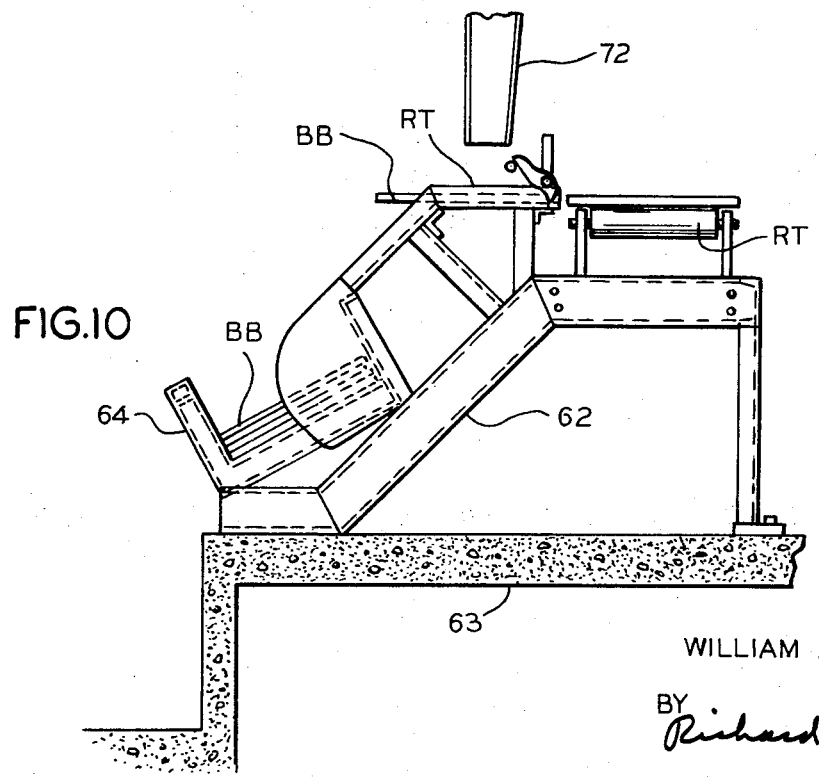
FIG. 10 is an elevational view of structure for receiving bottom boards which are separated from the mould when the latter is loaded on to the mould support table.

Referring also to FIG. 10, moulding machine 21 is connected to the mould handling machine 20 by a transfer conveyor TC which delivers a slip mould onto a receiving table RT which is supported on a frame 62 in turn supported on a pedestal 63. The moulds delivered by the matchplate moulding machine 21 are disposed on bottom boards BB which are separated from the mould in FIG. 10 and permitted to slide into a hopper 64 when the slip mould is removed therefrom.

Structure is provided for moving a mould M onto structure 30, when the same is indexed to a mould receiving position at the receiving table RT. As seen in FIG. 5, the moulds are arranged in a pair of concentric circular rows, and as illustrated in FIG. 5 there are a total of 24 moulds M being accommodated for rotative movement with the structure 30. The moulds M are numbered M1 through M24, and when a new mould is placed on the table member 38 it will move radially thereof to displace a mould numbered M25. Table members 38, as seen in FIG. 5 describe in their rotation what may be considered an annulus having a central opening 66.

Structure is provided for placing a mould delivered by transfer conveyor TC to the structure 30, and consists of an arm 67 extending laterally of the upper frame member 23 and secured thereto. Arm 67 has a downward extending portion 68 at the distal end thereof which supports the various control elements CE as seen in FIG. 1. Arm 67 has a pair of spaced gibs 69 on the outer faces thereof, these forming a track for spaced rollers 71 mounted on a plate 70 extending laterally and inward at the upper end of an essentially vertically extending pusher arm 72.

The lower end of pusher arm 72 is provided with a pusher shoe 73 pivoted at 74 to a bracket 76 secured at the lower end of arm 72. The pivotal shoe 73 is adapted to engage the side of a mould M1 to push the same onto the table member 38 seen in FIG. 6.

Structure is provided for moving the arm 72 in a direction to place the new mould M1 onto the table member 38. Such structure comprises an hydraulic cylinder 77 anchored to an abutment 81 depending from plate 70. The operation of cylinder 77 causes movement of the depending arm 72 with respect to the arm 67 and is so constructed that the action of arm 72 places a new mould M1 into position on the table member 38, see also FIG. 5, it displacing radially a mould designated as M13.

The latter mould was mould M1 on the previous revolution of the structure 30. As seen in FIGS. 5 and 6 the movement of the mould M1 moves mould M13 to the inner concentric row of moulds, mould M13 displacing radially inwardly mould M25, which has gone through two complete revolutions on the rotating structure.

Structure is provided for placing a mould weight MW on mould M1 as it is placed on the table member 38. Just prior to the placement of mould M1 on table member 38 a mould which has undergone a complete revolution in the outer circular row has the mould weight MW removed therefrom. As seen in FIG. 1, each mould weight MW has a grapple 86 extending upward therefrom and terminating on the lower face thereof in a recess 87 adapted to be engaged with a boss 88 disposed at the lower end of a grapple hook 89. Grapple hook 89 is adapted to be raised and lowered to raise the mould weight MW, and a mould weight lifting cylinder 91 is mounted at the end of an arm 92 depending from the lower side of the arm 67. Cylinder 91 has a piston rod 93 connected to an element 94 of the grapple hook 89, element 94 being guided on a vertical guide rod 96 secured to the lower end of the arm 92 and flanking cylinder 91.

The placement of the mould weight MW is preceded by the removal therefrom from the mould M13 which has undergone a full revolution of movement on the structure 30, the grapple hook 89 cooperating with the grapple 86 of the mould weight, so that upon actuation of the cylinder 91 the mould weight MW is lifted an amount sufficient to permit the new mould M1 to slide beneath the mould weight MW, the latter moving mould M13 to the inside row of moulds as has been previously described. When mould M1 is in proper position, the cylinder 91 actuates once more to place the mould MW gently upon the top of the mould.

The mould weight MW is provided with openings therein which are matched with the gates and risers of the mould. A pouring station, not shown, fills the mould M1 after it has been moved from the receiving station described to a subsequent point in its revolution with structure 30.

As seen in FIG. 1 the rotating mould supporting structure is enclosed and is surmounted by a hood 40 which is vented at the top. Hood 40 has a depending flange 40 with openings 40C therein to accommodate movement under the hood 40 after the moulds have completed their movement in the outer circular row.

The structure as described enables the poured moulds to have two complete revolutions, enabling the casting poured therein to move through a time interval sufficient to cool and solidify the casting.

After having gone through the travel interval described the mould M25 discharged at their inner periphery of the table 38 moves onto a shakeout conveyor 92, the mould M25 being received in a hopper 93 for such conveyor.

It will be appreciated that the mechanism described is under the control of circuitry referred to generally by the reference characters CE seen in FIG. 1.

I claim:

1. A mould handling machine for moving poured moulds through an interval to cool the castings therein comprising:
    a. rotating conveyor means adapted to have filled moulds arranged thereon in at least one circular row having a center corresponding to the center of rotation of said means and provided with an opening therein located inward radially of said circular row;
    b. means for rotating said conveyor means through step-by-step angular displacements to an unfilled mould receiving position thereon;
    c. means adapted to move an unfilled mould onto said conveyor means to displace substantially radially through said opening a filled mould positioned in said circular row and which has rotated with said conveyor means through 360° of angular displacement.

2. Mould handling mechanism according to claim 1 wherein means are provided for placing a mould weight on said unfilled mould for movement with said mould in said circular row.

3. Mould handling mechanism according to claim 2 wherein said means for placing said mould weight on the mould at said mould receiving position includes means for lifting a mould weight from a filled mould which has moved with said rotating structure through a full revolution thereof.

4. Mould handling mechanism according to claim 3 wherein said lifting means is adapted to maintain said mould weight in lifted position while the filled mould is moved inward radially by the placement of a mould on said structure means in said circular row.

5. Mould handling mechanism according to claim 4 wherein said lifting means is operable to place said mould weight on the unfilled mould received at said mould receiving position after said mould has moved radially inward.

6. Mould handling mechanism according to claim 1 including means for receiving a filled mould which has been moved from said table through said opening by the movement of an unfilled mould onto said structure.

7. Mould handling mechanism according to claim 1 wherein mould receiving means are disposed at said opening to receive a filled mould displaced by the reception of an unfilled mould in said circular row.

8. A mould handling machine for moving poured moulds through an interval to cool the castings therein comprising:
   a. a rotating table adapted to have filled moulds arranged thereon in at least one circular row having a center corresponding to the center of rotation of said table and provided with an opening therein located inward radially of said circular row;
   b. means for rotating said table to an unfilled mould receiving position of said table;
   c. means adapted to move an unfilled mould onto said table to displace substantially radially through said opening a filled mould positioned in said circular row and which has rotated with said table through 360° of angular displacement.

9. Mould handling mechanism according to claim 8 wherein means are provided for placing a mould weight on said unfilled mould for movement with said mould in said circular row.

10. Mould handling mechanism according to claim 9 wherein said means for placing said mould weight on the mould at said mould receiving position includes means for lifting a mould weight from a filled mould which has moved with said rotating table through a full revolution thereof.

11. Mould handling mechanism according to claim 10 wherein said lifting means is adapted to maintain said mould weight in lifted position while the filled mould is moved inward radially by the placement of a mould on said table in said circular row.

12. Mould handling mechanism according to claim 11 wherein said lifting means is operable to place said mould weight on the unfilled mould received at said mould receiving position after said mould has moved radially inward.

13. Mould handling mechanism according to claim 8 including means for receiving a filled mould which has been moved from said table through said opening by the movement of an unfilled mould onto said table.

14. Mould handling mechanism according to claim 8 wherein mould receiving means are disposed at said openings to receive a filled mould displaced by the reception of an unfilled mould in said circular row.

15. The method of cooling castings in poured moulds which comprises:
   a. moving an unpoured mould radially into position to displace radially one of a series of poured moulds arranged in at least one circular row having circular path of movement and which have completed a full revolution of movement in said circular path; , said displacement causing one of said poured moulds to drop into a mould dump;
   b. pouring said unfilled mould;
   c. moving said moulds while arranged in said circular row in a series of step-by-step angular displacements about a common center totaling 360° of angular movement of said moulds.

16. The method of claim 15 wherein an unpoured mould moves to a pouring station displaced angularly from the position where said unpoured mould moves radially.

17. The method of claim 15 wherein said unpoured mould is covered with a mould weight.

18. The method of cooling casting in poured moulds which comprises:
   a. moving an unpoured mould radially into position to displace radially one of a series of poured moulds arranged in at least one circular path of movement and which have completed a full revolution of movement in said circular path; said displacement causing one of said poured moulds to drop into a mould dump;
   b. pouring said unfilled moulds;
   c. moving said moulds while arranged in said circular row about a common center totalling 360° of angular movement of said moulds.

19. The method of claim 18 wherein an unpoured mould moves to a pouring station displaced angularly from the position where said unpoured mould moves radially.

20. The method of claim 18 wherein said unpoured mould is covered with a mould weight.

* * * * *